Patented Feb. 1, 1927.

1,616,156

UNITED STATES PATENT OFFICE.

EDWARD VROOM, OF OSSINING, NEW YORK, ASSIGNOR TO WESTERN ELECTRIC COMPANY, INCORPORATED, OF NEW YORK, N. Y., A CORPORATION OF NEW YORK.

SYSTEM FOR ENERGIZING AND TESTING REPEATERS.

Application filed October 7, 1924. Serial No. 742,271.

This invention relates to repeater circuits employing vacuum tubes and more particularly to means for maintaining proper operating conditions for the tubes.

In accordance with the present invention to economize in apparatus at a repeater station a grid potentiometer circuit common to a plurality of repeaters is provided, the potentiometer circuit being provided with a low and high current alarm system which may be reset by the same key employed to connect the plate current milliammeter into the grid potentiometer circuit.

In order to further economize in the maintenance of the repeater station, the present invention provides for substituting for a current meter and a resistance normally used to adjust the heating current in a filament circuit and remote from the repeater gain measuring set, an auxiliary current meter and variable resistance device located conveniently adjacent to the gain measuring set, when measuring repeater gain with normal filament current, or when making gain measurements at different filament currents for testing filament emissivity. As explained hereinafter, with the gain set and the auxiliary meter and resistance device in close proximity and with the normal filament current adjusting resistance temporarily out of circuit, such tests of gain at different values of filament current may be accurately and rapidly performed by the repeater attendant with a minimum disturbance of the normal operation of the repeater circuits and with a minimum requisite value of filament circuit potential.

The object of the invention is, therefore, to increase the efficiency and to facilitate the maintenance of repeater circuits.

The invention will be more fully understood from the following description considered in conjunction with the accompanying drawings.

Figure 1:
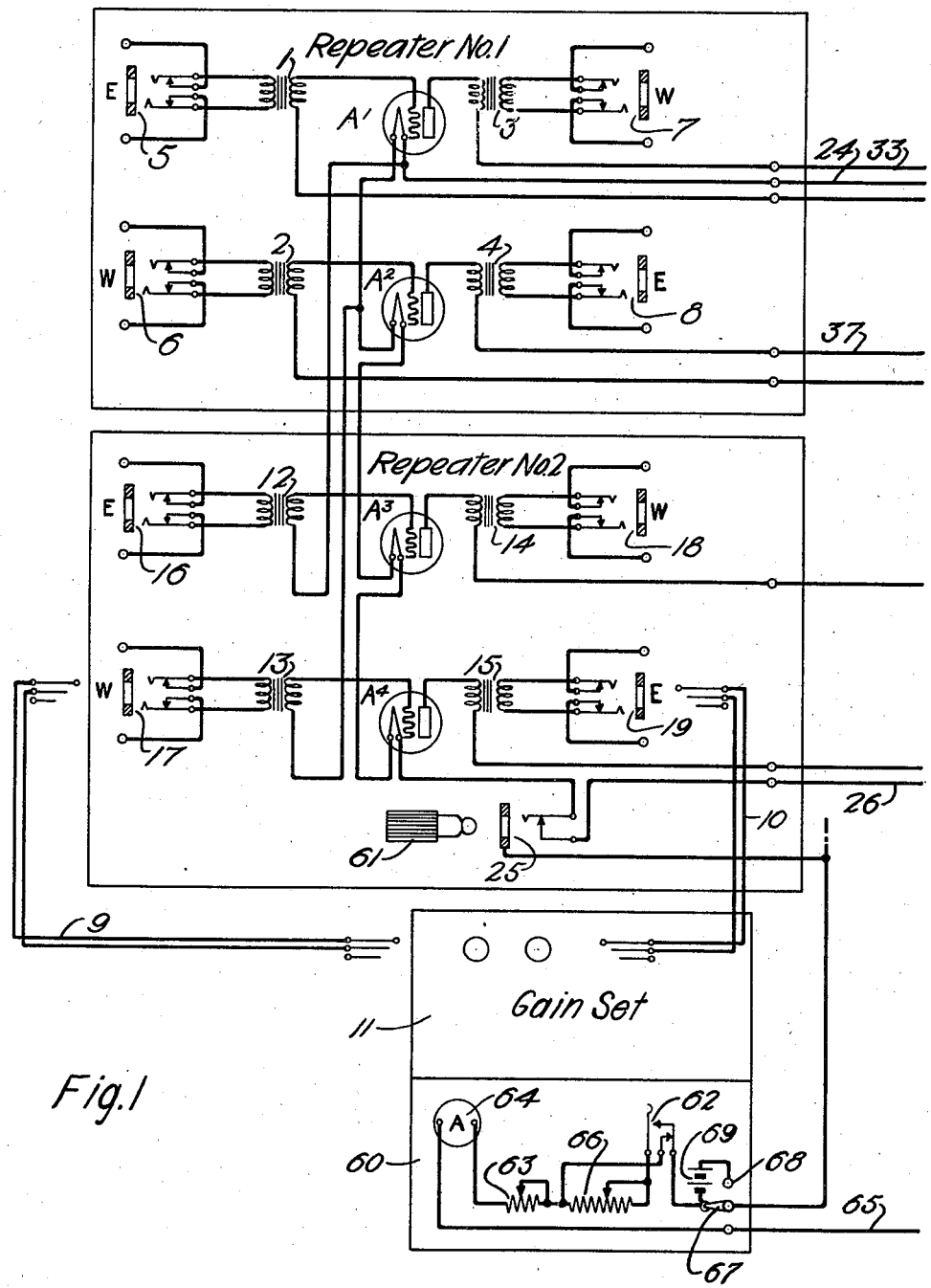

Fig. 1 discloses in the two large rectangles such portions of vacuum tube repeater circuits as are necessary to an understanding of this invention, in the uppermost of the two small rectangles a diagrammatic representation of a gain set for measuring the tube amplification and in the lowermost rectangle a filament control panel.

Figure 2:
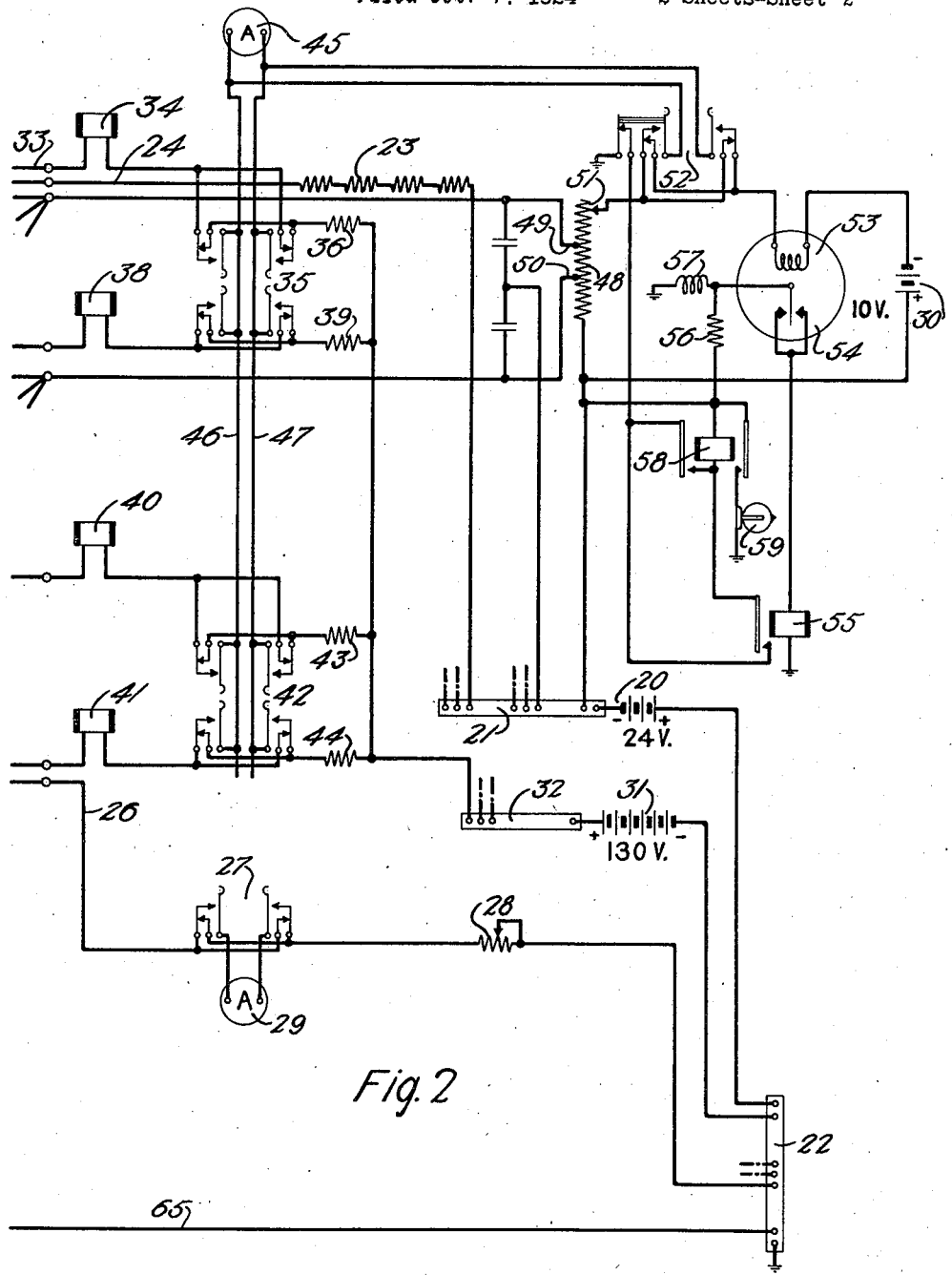

Fig. 2 discloses the battery supply panel common to the repeaters of the station for supplying filament, grid and plate potentials, together with the necessary measuring instruments for measuring the potentials applied to the repeater tubes, control keys and alarm equipment.

Considering the drawings in more detail, the repeater No. 1 in Fig. 1 is represented as comprising two vacuum tubes $A^1$ and $A^2$, input transformers 1 and 2, output transformers 3 and 4, and jacks 5, 6, 7 and 8 by means of which the normal input and output circuits of the repeaters may be opened and input and output circuits of the tubes connected through cords 9 and 10 with the gain set 11, which may be of any suitable type, for instance the type disclosed in Whiting Patent 1,442,455, January 16, 1923. Similarly, the repeater designated No. 2 comprises two vacuum tubes $A^3$ and $A^4$, input transformers 12 and 13, output transformers 14 and 15 and jacks 16, 17, 18 and 19, similarly accessible to cords 9 and 10.

Filament heating current is supplied to the filaments of all four tubes of the two repeaters serially from a common source of 24-volt potential 20, source 20 being for convenience of installation connected between the negative bus bar 21 and the ground bus bar 22. This filament circuit extends from bus bar 21 through conductor 24, in which are connected resistances 23 referred to hereinafter, through the filaments of the tubes $A^1$, $A^2$, $A^3$ and $A^4$ serially, normal contacts of jack 25, conductor 26, normal contacts of key 27, filament current control rheostat 28 to the ground bus bar 22.

The key 27 is provided in this circuit to enable the repeater attendant to determine at any time the amount of current flowing through the filaments of the repeater tubes. When the key is operated to its alternate position the ammeter 29 is interposed in the filament circuit.

The source of current 20 is common to the repeater groups of the station as is the source 30 of grid potential. In order that a common source of grid potential may be used and the grids of tubes having their filaments in different heating circuits connected to the same point on the source of common potential 30, each filament heating circuit is provided with resistances 23 of such value with reference to the resistance of the conductor 24 of that circuit, that, with the filament current of that circuit at its normal value, the drop in potential between the negative end of the filament of the first tube $A^1$ and the negative bus bar 21 will be the same for all the filament heating circuits, so that a definite potential from the common source of grid potential can be supplied to the grids of the tubes whose filaments are nearest to the negative bus bar 21. If the common source of grid potential is not used the padding resistances are omitted.

Space current is supplied to the plates of all of the tubes from the common source 31 which is connected between the ground bus bar 22 and the positive 130-volt bus bar 32. The plate circuit for tube $A^1$ extends from the plate of that tube over the primary winding of the output transformer 3, conductor 33, winding or relay 34, upper normal contacts of key 35, protective resistance 36 to the positive bus bar 21. The plate circuit of output $A^2$ extends through the primary winding of transformer 4, conductor 37, winding of relay 38, lower normal contacts of key 35, protective resistance 39 to the bus bar 32. Similarly, the plate circuits of tubes $A^3$ and $A^4$ extend to the bus bar 32, through windings of relays 40 and 41, the upper and lower normal contacts of key 42 and protective resistances 43 and 44, respectively.

Keys 35 and 42 are provided to enable the attendant to interpose the milliammeter 45 in any one of the plate circuits for measuring the space current flowing. For example, if the key 35 is operated to its upper position the plate circuit of tube $A^1$ instead of extending directly from relay 34, through protective resistance 36, to the bus bar 32, will extend through the upper left alternate contacts of key 35, conductor 46, milliammeter 45, conductor 47, upper right alternate contacts of key 35, thence through resistance 36 to the bus bar 32. If key 35 is operated to its lower position the milliammeter 45 will be connected into the plate circuit of tube $A^2$. Similarly, key 42 in its upper and lower positions connects the milliammeter into the plate circuits of tubes $A^3$ and $A^4$, respectively.

Relays 34, 38, 40 and 41 in the plate circuits of the tubes are held operative so long as space current is flowing in the respective tubes. The failure of space current in any tube will release the corresponding relay and close an alarm circuit (not shown). For example, if a filament of one of the tubes should burn out, all relays would release, thus giving a signal that the repeater is not functioning. This feature, however, forms no part of the present invention.

The grid potential for the tube $A^4$ is taken from the negative end of the filament of the second tube $A^2$ from battery 20, since this point is 9 volts negative with respect to the negative end of the filament of tube $A^4$, there being 4½ volts drop of potential for the filament of each tube. The grid potential for the third tube $A^3$ is obtained from the negative end of the filament of tube $A^1$, since this point is 9 volts negative with respect to the negative end of the third tube $A^3$ from battery 20. The negative potentials for the other two grids are obtained partly from the voltage drop in conductor 24 and resistances 23, but are obtained principally from a common battery 30, through potentiometer 48, which is bridged across the battery 30. One tap 49 is connected to the potentiometer at a point to give the proper grid potential for the first tube $A^1$. Another tap 50 is connected at a point which is 4½ volts lower in potential to give the proper potential for the second tube $A^2$, since there is a drop of 4½ volts at the negative end between the first and second tubes. Since by means of the padding resistances 23 in the various filament heating circuits the resistance from the battery bus bar 21 to the filament of the first repeater tube $A^1$ is kept at a fixed value for all of those circuits, it is possible to place the common grid battery taps 49 and 50 on definite points of the potentiometer 48. The common grid potentiometer 48 is also provided with an adjustable contact 51 to keep the current flowing through the grid potentiometer circuit constant. In order that the attendant may check the amount of current flowing through this circuit key 52 is provided which interposes the milliammeter 45 in series with the potentiometer 48, source 30 and winding of voltmeter relay 53.

The voltmeter relay 53 is provided for the purpose of operating an alarm whenever the current flowing in the grid potentiometer circuit goes above or below a certain predetermined operating value. Normally, when the current remains at the proper predetermined value of .01 ampere, relay 53 floats in the circuit without functioning. If, however, the current exceeds or falls below the predetermined limits of .0095 and .0105 ampere, to which the relay 53 is adjusted, relay 53 operates, closing its contacts 54 and establishing a circuit for relay 55, extending from bus bar 21, through resistance 56, thence in parallel through resistance 57 to ground and through contacts 54 to relay 53 and winding of relay 55 to ground. Relay 55 energizes, closing a circuit for relay 58 extending from bus bar 21, winding of relay 58, contact of relay 55 to ground at the outer left normal contact of key 52. Relay 58 locks independently of relay 55 over its left contact and at its right contact closes an obvious circuit for the signal lamp 59. Since relay 58 is locked through a contact of key 52, the lamp 59 will remain lighted until the attendant operates the key 52 to check the value of the current in the potentiometer circuit.

The attendant may at any time check the emissivity of the filaments of a repeater by employing the filament current adjusting set 60 in conjunction with the gain set 11. To employ the adjusting set 60 the attendant first inserts the solid plug 61 in the jack 25, associated with the repeater tubes to be tested. The filament heating circuit then extends from the positive side of the filament of the fourth tube A⁴, through the tip of the jack 25, plug 61, sleeve of jack 25, switch 67, normal contacts of key 62, rheostat 63, ammeter 64, conductor 65 to the ground bus bar 22, rather than to the ground bus bar through the normal contacts of jack 25, key 27 and rheostat 28. The attendant may now read the value of current flowing through the filament heating circuit on the ammeter 64 and adjust the rheostat 63 until the ammeter 64 indicates that the maximum permissible heating current is flowing through the filaments of the repeater tubes. The gain of any tube may then be tested under this condition, by connecting the gain set 11 with the input and output circuits of that tube by means of cords 9 and 10. Having tested the gain for the maximum permissible filament current, the gain for the minimum current may then be tested by first operating the key 62 which connects the rheostat 66 in series with rheostat 63, and then adjusting rheostat 66 until the ammeter 64 indicates the proper minimum value of current. In the event that the battery 20 does not furnish sufficiently high potential to produce the proper maximum value of heating current, the switch 67 may be operated into engagement with contact 68 to include the dry cell booster battery 69 in series with battery 20 in the filament heating circuit. From the change of gain of any tube due to the variation of its filament current from the maximum to the minimum permissible operating limit, or vice versa, the condition of the tube, as regards filament emissivity, and consequently the fitness or unfitness of the tube for service, is determined, so that the tube may accordingly be retained for service, or rejected. The gain set 11 and the auxiliary filament current adjusting set 60 may be common to a large number of filament heating circuits and repeaters. Ordinarily when rheostats 63 and 66 have been adjusted, little or no change in their adjustment is required for a considerable period, even when they are being connected into various filament heating circuits. This facilitates rapid testing. The removal of rheostat 28 from circuit when rheostat 63 is cut in circuit, facilitates the obtaining of the maximum permissible operating value of filament current without necessitating undue increase in the electromotive force required for producing that value of current, and further, prevents any operation of the rheostat 28 by the battery attendant in the battery supply bay from interfering with gain tests the repeater attendant may be conducting at the rheostats 63 and 66, which may be remote from the rheostat 28.

What is claimed is:

1. In a repeater system having groups of electron tubes, a common grid battery circuit comprising a source of current, a potentiometer and a current responsive device, an alarm signal, and means operated by said responsive device when the current in said circuit exceeds or falls below definite limits for operating said signal.

2. In a repeater system having groups of electron tubes, a common grid battery circuit comprising a source of current, a potentiometer and a current responsive device, a current measuring device, a key for interpolating said measuring device in said circuit, an alarm signal, means operated by said responsive device when the current in said circuit exceeds or falls below definite limits for operating said signal, and means controlled by said key for discontinuing the operation of said signal.

3. In a repeater system, a plurality of electron discharge repeaters each having a cathode and an output circuit, cathode energizing circuits for said repeaters, each of said cathode energizing circuits including an impedance individual thereto for adjusting the energizing current supplied to the cathode to a normal value, means adapted to be associated with the output circuit of any one of said repeaters for measuring the repeater gain in accordance with different values of cathode energizing current, separate current adjusting means and switching means for connecting said separate current adjusting means into the cathode energizing circuit of any one of said repeaters, and for removing from the cathode energizing circuit of said one repeater the current adjusting impedance individual thereto, whereby the cathode emissivity of said repeater may be tested without disturbing the normal operation of the others of said repeaters and with a minimum requisite value of cathode potential.

In witness whereof, I hereunto subscribe my name this 29th day of September A. D., 1924.

EDWARD VROOM.